United States Patent Office

2,809,398
Patented Oct. 15, 1957

2,809,398

PROCESS FOR THE PRODUCTION OF ARTIFICIAL LEATHER FROM POLYVINYL CHLORIDE

Karl Stiehl, Hanau (Main), and Johannes Cornelius Valenteyn, Wolfgang, Kreis Hanau, Germany, assignors to Deutsche Gold- und Silber-Scheideanstalt vormals Roessler, Frankfurt am Main, Germany No Drawing. Application October 19, 1953,
Serial No. 387,071

Claims priority, application Germany October 25, 1952

5 Claims. (Cl. 18—47.5)

The present invention relates to an improved process for the production of artificial leather from polyvinyl chloride which "breathes," that is, is pervious to gases such as air and water vapor, but on the other hand, is substantially impervious to water in liquid form.

Artificial leathers have been produced by applying polyvinyl chloride pastes containing softeners and pigments to woven textiles or fiber webs and subsequently gelling such pastes and stamping them to form leatherlike products. Also, unsupported leatherlike polyvinyl chloride foils have been produced in similar fashion. In comparison to natural leather such artificial leathers have the disadvantage that they are neither pervious to air nor pervious to water vapor so that they are rather unsuited for use in the production of clothing.

Several suggestions have already been made in order to avoid this disadvantage, for example, by perforating such artificial leather in an attempt to provide porosity thereof. Such perforation of the artificial leather has, for example, been carried out by passing the artificial leather through needle bearing rollers or by piercing the artificial leather with electric sparks in a high voltage electric field. The disadvantages of such procedures is that the porosity achieved not only renders the artificial leather pervious to air and water vapor, but also to water in liquid form. Furthermore, the mechanically or electrically produced perforations have a tendency to decrease the strength of the artificial leather as well as deleteriously affect the surface appearance thereof. In order to avoid such difficulties use has been made of "blowing" agents to produce fine pores in the polyvinyl chloride masses. Also, attempts have been made to provide the desired porosity by incorporating liquids of suitable boiling points in the polyvinyl chloride pastes which evaporate during gelling of the polyvinyl chloride. The porosity achieved with the aid of such "blowing" agents or volatile liquids in the gelled polyvinyl chloride layer is such to render them pervious to air and water vapor. However, the subsequent stamping or graining procedures usually employed to provide the necessary leatherlike surface compress the pores to such an extent that the finished artificial leather product is no longer satisfactorily pervious to air and water vapor. It has also been suggested to incorporate water soluble substances or substances which could be rendered water soluble upon subsequent treatment in the polyvinyl chloride masses, which were later to be dissolved out of the polyvinyl chloride mass after gelling to effect the desired porosity. This procedure, however, proved too complicated and costly for practical application. Furthermore, the spongy nature of the resulting polyvinyl chloride layer left much to be desired.

It has been unexpectedly found according to the invention that polyvinyl chloride artificial leather products of satisfactory porosity even after the usual stamping or graining operations could be achieved in the gelled masses produced from the usual polyvinyl chloride composition containing softening agents and pigments to which at least 3% preferably 5 to 20% of a high molecular weight organic substance capable of swelling and forming gels with water or other solvents in which polyvinyl chloride is insoluble and a small amount of water or other solvent in which a part or all of the substance is swollen had been admixed. The high molecular weight substances, capable of swelling and forming gels with water according to the invention are such substances which are capable of binding water in hydrate form while undergoing swelling phenomena. Examples of such substances are carbohydrates such as starch, dextrin, pectin, alginates; the water soluble albumens such as casein and gelatin; the water soluble cellulose derivatives, such as methyl cellulose and cellulose glycolil acid salts; as well as other substances such as polyvinyl alcohol, and salts of polyacrylic acid and polymethacrylic acid. Starch and dextrin have been found exceptionally well suited as the gel forming substances employed according to the invention. High molecular weight substances which are capable of swelling and forming gels with liquids other than water which nevertheless have no solvent action on polyvinyl chloride, for example, solvents such as methanol, ethanol, benzine or other aliphatic hydrocarbons, which can be employed according to the invention are, for example, the following polyvinyl acetate, polyvinylacetal, the polyamides and benzyl cellulose.

The high molecular gel forming substances are preferably incorporated in the polyvinyl chloride compositions by first mixing such substance, if desired, with the addition of an emulsifier with the water or other liquid with which the substance is capable of forming a gel until a highly viscous paste is formed and then mixing this paste with softener and pigment containing polyvinyl chloride compositions suitable for the production of artificial leather in a rapidly rotating stirrer.

When an especially high permeability to air is desired, the effect obtained with the aid of the high molecular substances employed according to the invention can be increased by employing such substances in conjunction with blowing agents.

As blowing agents, all substances can be employed which decompose with the formation of gas at temperatures between 20° and 200° C., but leave no residues which may injure the polyvinyl chloride mass or may be physiologically objectionable. Such substances, are for example, azo dibutyric acid nitrile (sold under the tradename Porophor), ammonium carbonate, ammonium bicarbonate, iron oxalate, ethyl malonic acid, benzoic acid, o- and m-azoxybenzoic acid, diamino diphenyl diamine, hydrabenzol, citric acid and the like as well as per compounds, such as benzoyl, peroxide and percarbamide. The quantity of blowing agent employed can be from 0 to 10%, preferably 0.2 to 5%. They can be added to the polyvinyl chloride coating composition either in finely divided form or dissolved in water. Also, if desired, activators for such blowing agents may be added. The temperature employed for gelling the coating composition is necessarily selected at least as high as the decomposition temperature of the blowing agent.

The hydrophilic character of the artificial leather can also be adjusted by mixing water insoluble hydrophilic fillers to the polyvinyl chloride coating compositions according to the invention. Such hydrophilic fillers, for example, can be capillary active fillers such as cellulose fibers, such as cotton or regenerated cellulose flocks, paper flour, wood flour or cork flour or albumen containing products such as leather flour or flocks of animal hair as well as water insoluble inorganic hydrophilic materials such as bentonite, silica gel and finely divided silica. The water vapor permeability of the artificial leather can be varied considerably by the addition of such fillers.

Similarly variations in the water vapor permeability of the artificial leather products according to the invention can be achieved by replacing the ordinary softeners employed with softeners of hydrophilic nature or by mixing such hydrophilic softeners with the ordinary softeners. Such hydrophilic softeners are, for example, partially esterified polyalcohols, such as, pentaerythritol, glycerine, and the like as well as other softeners which contain a free hydroxyl group in the molecule such as, for example, a partially acetylated castor oil sold under the trade name "Ricatyl 050 A."

The following examples will serve to illustrate several modifications of the process according to the invention.

Example 1

A cotton twill of a weight of about 270 g./m.$^2$ was coated with 350 g./m.$^2$ of a coating composition of essentially the following composition.

45.0% polyvinyl chloride
29.0% dioctyl phthalate
9.0% coloring pigment
0.6% leather flour
2.5% hard paraffin
5.5% benzine
5.7% starch (commercial potato starch, moisture content 18%)
2.7% ammonium carbonate The preparation of the coating composition was effected by triturating the polyvinyl chloride, softener and pigment in the usual manner and slightly gelling the mass. The paraffin was dissolved in the benzine and mixed with the resulting paste. The starch was either kneaded into such paste as a dry powder or after swelling a portion thereof in water. The spreadability of the coating composition could be varied within certain limits in this manner. The ammonium carbonate was dissolved in a little water and incorporated as the last component of the coating composition.

The fabric coated with such composition was then passed through a chamber heated to about 170° C. in 4 to 6 minutes. Directly after leaving the heated chamber the coated fabric was stamped in the usual manner to produce a leatherlike grain on the surface thereof.

The resulting artificial leather had a water vapor permeability of 200/240 mg./1000 mm.$^2$ in 24 hours against absolutely dry air. Its permeability to air at a super atmospheric pressure of 50 cm. water column was 600–700 ccm./100 cm.$^2$ per minute.

Example 2

A coating composition of the following composition:

45.0% polyvinyl chloride
29.0% dioctyl phthalate
9.0% coloring pigment
5.7% starch (commercial potato starch, moisture content 18%).
9.3% water
3.0% benzine was prepared by triturating the pigment with a portion of the dioctyl phthalate and then stirring in the remainder of the dioctyl phthalate and the polyvinyl chloride and homogenizing the mixture and then incorporating the benzine and the starch previously swollen in the amount of water indicated with the aid of a rapidly rotating stirrer.

The resulting coating composition was coated with a doctor on a cotton twill of a weight of 270 g./m.$^2$ in a quantity of about 350 g./m.$^2$ The coated twill was then heated for 4 minutes at about 170° C. to gel the coating composition and then stamped to provide a normal upholstery leather grain thereon.

The resulting artificial upholstery leather had an air permeability of about 600 ccm./100 cm.$^2$ and a water vapor permeability of 250 mg./1000 mm.$^2$ under the same conditions as given in Example 1.

Example 3

A coating composition of the following composition:

43% polyvinyl chloride
28% dioctyl phthalate
9% coloring pigment
6% benzyl cellulose
14% xylol was prepared by first swelling the benzyl cellulose in the xylol and mixing a portion of dioctyl phthalate to reduce its viscosity and then adding the remainder of the dioctyl phthalate which had been triturated with the pigment and the polyvinyl chloride and homogenizing the entire mixture on a friction mill.

The resulting coating composition was then spread as in Example 2 upon a cotton fabric of a weight of 230 g./m.$^2$ in a quantity of 300 g. dry substance per square meter. The coated fabric was first heated to 90° to 110° C. for a half an hour to effect preliminary gelling, then gelled at 170° C. and then stamped with upholstery graining.

The resulting artificial upholstery leather had an air permeability of 500 to 550 ccm./100 cm.$^2$ and a water vapor permeability of about 220/100 mm.$^2$ under the same conditions as given in Example 1.

Example 4

A coating composition of the following composition:

45.0% polyvinyl chloride
29.0% dioctyl phthalate
8.5% coloring pigment
1.1% leather flour
5.7% low esterified pectin
10.7% water was prepared in an analogous manner to the composition of Example 2, the leather flour being added as the last component.

This coating composition was coated on a cotton twill of a weight of 270 g./m.$^2$ and the coated fabric was then heated to gel the coating composition and then stamped to provide a customary upholstery grain.

The resulting upholstery material had an air permeability of about 700 ccm./100 cm.$^2$ and a water vapor permeability of about 250 mg./1000 mm.$^2$ under the same conditions as given in Example 1.

Example 5

A coating composition of the following composition:

45.0% polyvinyl chloride
29.0% dioctyl phthalate
9.0% coloring pigment
6.3% starch (commercial potato starch, moisture content 18%)
8.0% water
2.7% ammonium carbonate was prepared by dissolving the ammonium carbonate in the water and permitting the starch to swell in such solution and then incorporating such mixture into a normally prepared paste of polyvinyl chloride, dioctyl phthalate and pigment with the aid of a rapidly rotating stirrer.

The resulting coating composition was spread upon a cotton fabric of a weight of 230 g./m.$^2$ in a quantity of 400 g. dry substance per square meter.

The coated fabric was then heated in the usual manner to 170° C. to effect gelling of the coating composition and was then stamped with a grain customary for upholstery materials.

The resulting upholstery material had an air permeability of about 800 ccm./100 cm.$^2$ and a water vapor permeability of about 250 mg./1000 mm.² under the same conditions as in Example 1.

*Example 6*

A coating composition of essentially the following composition:

50.0% polyvinyl chloride
21.0% dioctyl phthalate
8.0% dibutyl phthalate
11.0% coloring pigment
0.8% leather meal
0.2% paper flour
6.0% starch (commercial potato starch moisture content 18%)
1.5% ammonium carbonate
1.5% ammonium percarbonate was prepared by triturating the polyvinyl chloride, pigment and softeners and slightly gelling the mass; then kneading in the leather meal and paper flour; and finally kneading in the starch which had been swollen in the small amount of water in which th ammonium carbonate and percarbonate had previously been dissolved.

This coating composition was spread on a cotton twill of a weight of 300 g./m.² in a quantity of 400 g./m.². The coated fabric was then passed through a chamber heated to 170° C. in 4–6 minutes and directly thereafter stamped to produce a leatherlike grain upon its surface.

The resulting grained artificial leather had an air permeability of 500–700 ccm./100 cm.² and a water vapor permeability of 200–300 mg./1000 mm.² under the same conditions as in Example 1.

The artificial leather products produced according to the invention not only possess a desirable permeability to air and water vapor, but they are practically impervious to water in the liquid phase. A satisfactory gas permeability of such artificial leather is retained despite the fact that in it production it has undergone a stamping or graining operation in which the surface thereof is smoothed or grained to resemble leather by the application of pressure. This is believed due to the fact that residual structure of high molecular weight organic materials capable of swelling and forming gels retained in the product after heating the sheeted polyvinyl chloride composition to effect gelling thereof prevent the microscopic pores formed from collapsing during the application of the pressure necessary for smoothing or graining the surface.

We claim:

1. In a process of producing artificial leather from pigment and softener containing polyvinyl chloride compositions the steps which comprise incorporating a high molecular weight organic material capable of swelling and forming a gel with water in the presence of water in a pigment and softener containing polyvinyl chloride composition suitable for the production of artificial leather, the quantity of said high molecular weight organic material being 3% to 20% of said composition, sheeting said composition in which the high molecular weight organic material has been incorporated, heating said sheeted composition to effect gelling thereof, and stamping the gelled composition to provide a leatherlike surface thereon without prior removal of said high molecular weight organic material therefrom.

2. The process of claim 1, in which said high molecular weight material is starch.

3. The process of claim 1, in which said pigment and softener containing polyvinyl chloride composition suitable for the production of artificial leather also contains a water insoluble hydrophilic filler.

4. The process of claim 1, in which said pigment and softener containing polyvinyl chloride composition suitable for the production of artificial leather also contains a blowing agent and said heating of the sheeted composition is effected at a temperature at which such blowing agent decomposes with gas formation.

5. The process of claim 1, in which at least a portion of said softener is a hydrophilic softening compound containing at least one free hydroxyl group.

References Cited in the file of this patent

UNITED STATES PATENTS

| 2,274,231 | Behrman | Feb. 24, 1942 |
| 2,504,208 | Locke et al. | Apr. 18, 1950 |
| 2,542,527 | Honey et al. | Feb. 20, 1951 |

FOREIGN PATENTS

| 123,869 | Australia | Apr. 13, 1947 |